United States Patent

Sugaya

[11] Patent Number: 6,061,070
[45] Date of Patent: May 9, 2000

[54] CHARACTER OUTPUTTING

[75] Inventor: Akio Sugaya, Yokohama, Japan

[73] Assignee: Canon Kabushiki Kaisha, Tokyo, Japan

[21] Appl. No.: 07/646,202

[22] Filed: Jan. 28, 1991

[30] Foreign Application Priority Data

Jan. 31, 1990 [JP] Japan .................................. 2-020718

[51] Int. Cl.$^7$ .................................................. G06F 15/00
[52] U.S. Cl. ........................................................ 345/467
[58] Field of Search ................................ 395/150, 151, 395/144, 141, 142, 143; 345/467, 468, 469, 141, 142, 144, 470

[56] References Cited

U.S. PATENT DOCUMENTS

| | | | |
|---|---|---|---|
| 4,029,947 | 6/1977 | Evans et al. | 235/151 |
| 4,270,172 | 5/1981 | Tidd et al. | 364/523 |
| 4,593,372 | 6/1986 | Bandai et al. | 364/719 |
| 4,879,666 | 11/1989 | Kembo | 395/151 |
| 4,931,953 | 6/1990 | Uehara et al. | 364/518 |
| 4,953,033 | 8/1990 | Sakamoto | 358/300 |
| 5,021,974 | 6/1991 | Piscolli et al. | 364/518 |
| 5,040,129 | 8/1991 | Nishiyama | 395/150 |
| 5,150,459 | 9/1992 | Kajimoto | 395/151 |
| 5,150,460 | 9/1992 | Onodera et al. | 395/151 |
| 5,155,805 | 10/1992 | Kaasila | 395/151 |
| 5,175,811 | 12/1992 | Sone et al. | 395/150 |
| 5,212,769 | 5/1993 | Pong | 395/150 |

FOREIGN PATENT DOCUMENTS

| | | |
|---|---|---|
| 323240 | 5/1989 | European Pat. Off. . |
| 62-212167 | 9/1987 | Japan . |
| 63315256 | 4/1989 | Japan . |
| 01128843 | 8/1989 | Japan . |
| 02001349 | 3/1990 | Japan . |

*Primary Examiner*—Phu K. Nguyen
*Attorney, Agent, or Firm*—Fitzpatrick, Cella, Harper & Scinto

[57] ABSTRACT

An output apparatus comprises: an input device to input an output format of a pattern; a data producing circuit to produce data regarding an outline font from a dot font pattern; and an outline font pattern producing circuit to produce an outline font pattern from the dot font pattern produced by the data producing circuit in accordance with an input character code. When a character code is input, an outline font is produced from a dot pattern and, thereafter, a dot font pattern of a designated shape is generated from the outline font.

24 Claims, 5 Drawing Sheets

CHARACTER OUTPUTTING

BACKGROUND OF THE INVENTION

1. Field of the Invention

The present invention relates to an output apparatus in which when a character code is supplied, an outline font is produced from a dot pattern and, thereafter, a dot font pattern of a designated shape is generated from the outline font.

2. Related Background Art

Hitherto, a dot pattern font and an outline font are individually registered and stored as different patterns. Each of the dot pattern font and the outline font has a merit and a demerit. In the case of the dot pattern font, although a generating speed is high, it is necessary to register a plurality of sets in accordance with output sizes. On the other hand, in the case of the outline font, although a generating speed is slow, there is no need to register a plurality of sets in accordance with output sizes. However, even in the case of the outline font, many storage areas are needed to store data such as coordinate points constructing an outline of a character, breaking points of the outline, and the like as compared with a dot pattern of a most standard size of about 10-point (one point is equal to 1/72 inch).

SUMMARY OF THE INVENTION

It is an object of the invention to provide an output apparatus in which dot font patterns are stored and when a character code is supplied, outline data is produced and a dot pattern of a desired size is generated, thereby reducing storage areas.

Another object of the invention is to provide an output apparatus in which when data indicative of a pattern to be output is supplied, a size of the pattern to be output is discriminated and it is possible to control so as to select either a mode in which a dot font pattern is read out and generated or a mode in which outline data is produced from the dot font pattern and, thereafter, it is converted into a dot pattern of the output size and generated.

Still another object of the invention is to provide an output apparatus which has, for instance, one kind of dot font pattern and produces outline data from the dot font pattern in accordance with a character code input and produces a dot pattern of a desired size.

DETAILED DESCRIPTION OF THE PREFERRED EMBODIMENT

An embodiment of the invention will be described in detail hereinbelow with reference to the drawings. The invention can be applied to a system comprising a plurality of apparatus or can be also applied to the case which is accomplished by applying a program to a system or an apparatus.

Figure 5:
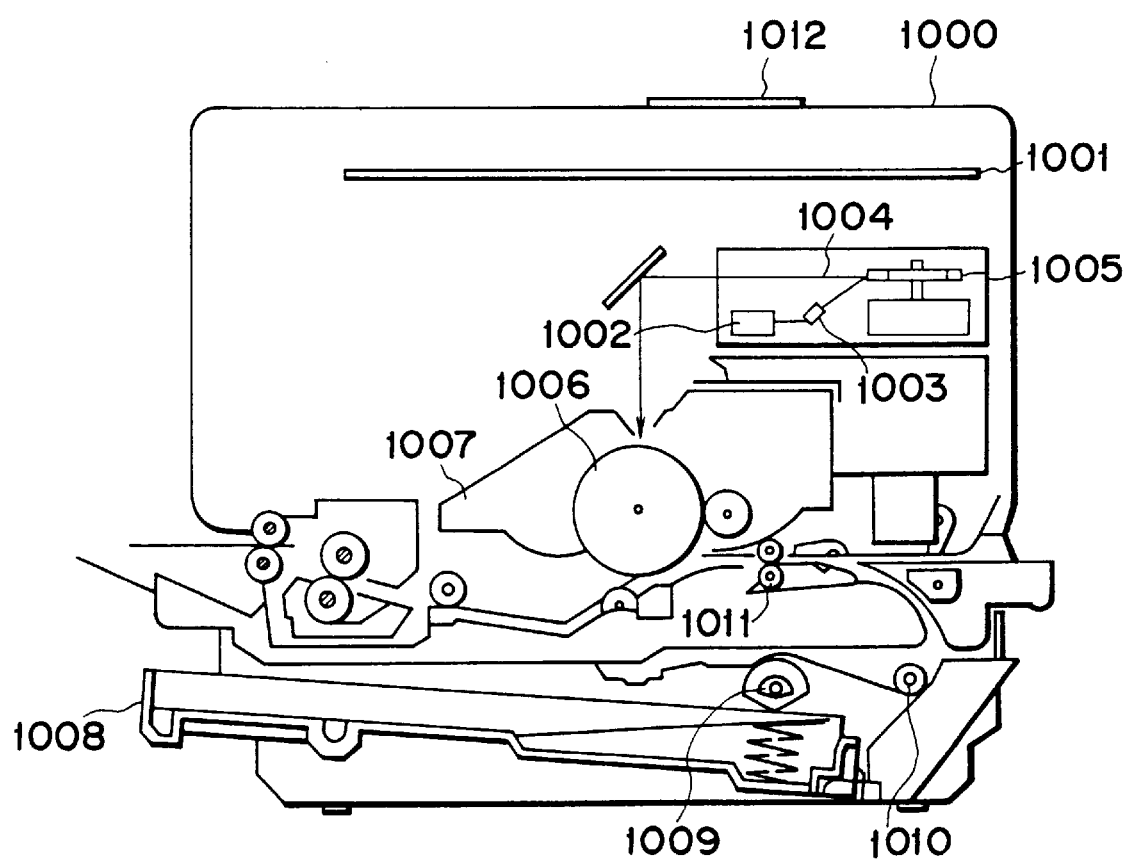
FIG. 5 is a diagram showing a structure of a printer.

FIG. 5 is a cross sectional view showing an internal structure of a laser beam printer (hereinafter, abbreviated to an LBP) to which the embodiment is applied. The LBP can register a character pattern, a fixed format (form data), and the like from a data source (not shown).

Figure 1:
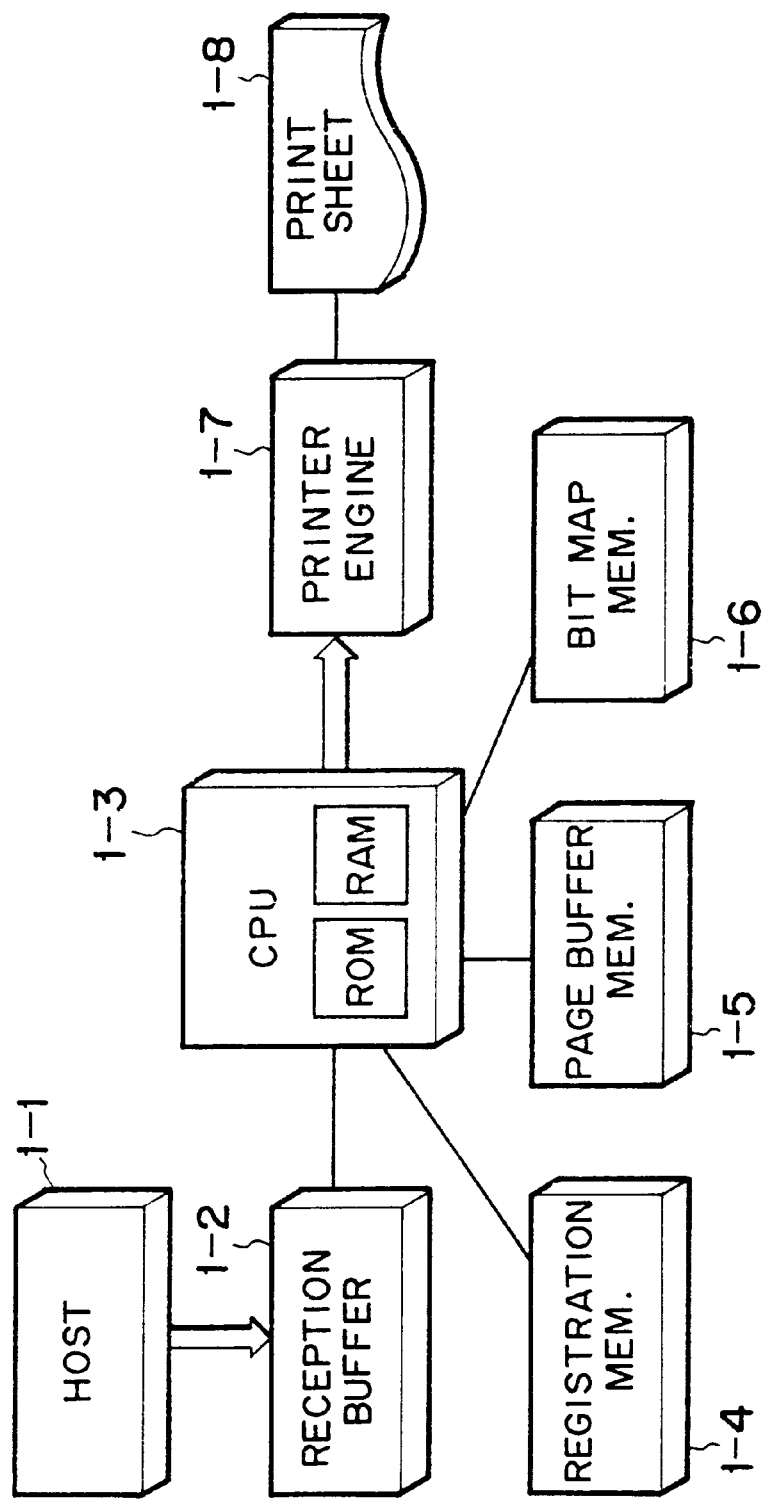
FIG. 1 is a constructional diagram showing a printing apparatus.

In the diagram, reference numeral 1000 denotes an LBP main body (FIG. 1). Character data (character code), form data, a macro instruction, or the like which is supplied from a host computer (1-1 in FIG. 1) connected to the outside is supplied and stored into the LBP main body 1000. The LBP produces a corresponding character pattern, form pattern, and the like in accordance with the input data and forms an image onto a recording paper as a recording medium. Reference numeral 1012 denotes an operation panel on which operation switches, an LED display, and the like are arranged. Reference numeral 1001 denotes a printer control unit for controlling the whole LPB 1000 and analyzing the character data or the like which is supplied from the host computer. The control unit 1001 mainly converts the character data into a video signal of the corresponding character pattern and generates to a laser driver 1002.

The laser driver 1002 drives a semiconductor laser 1003 and on/off switches a laser beam 1004 which is emitted from the semiconductor laser 1003 in accordance with the input video signal. The laser beam 1004 is irradiated to the right and left by a rotary polygonal mirror 1005 and scans on an electrostatic drum 1006. Thus, an electrostatic latent image of a character pattern is formed on the drum 1006. The latent image is developed by a developing unit 1007 arranged around the drum 1006 and, thereafter, it is transferred onto a recording paper. A cut sheet is used as a recording paper. The cut sheets are enclosed in a paper cassette 1008 attached to the LBP 1000 and are inserted into the apparatus by a paper feed roller 1009 and conveying rollers 1010 and 1011 one by one and supplied to the drum 1006.

FIG. 1 is a block diagram of a control unit to control the whole LBP. In the diagram, reference numeral 1-1 denotes the host computer to transfer data; 1-2 indicates a reception buffer to store reception data; and 1-3 a CPU to control the apparatus. Programs shown by flowcharts, which will be explained hereinlater, have been stored in an ROM. Reference numeral 1-4 denotes a registration memory to store registered dot pattern fonts; 1-5 a page buffer to store the received data every page; 1-6 a bit map memory to store an output image of one page; 1-7 a printer engine to generate data in the bit map memory 1-6 to the paper; and 1-8 a print sheet.

Figure 2:
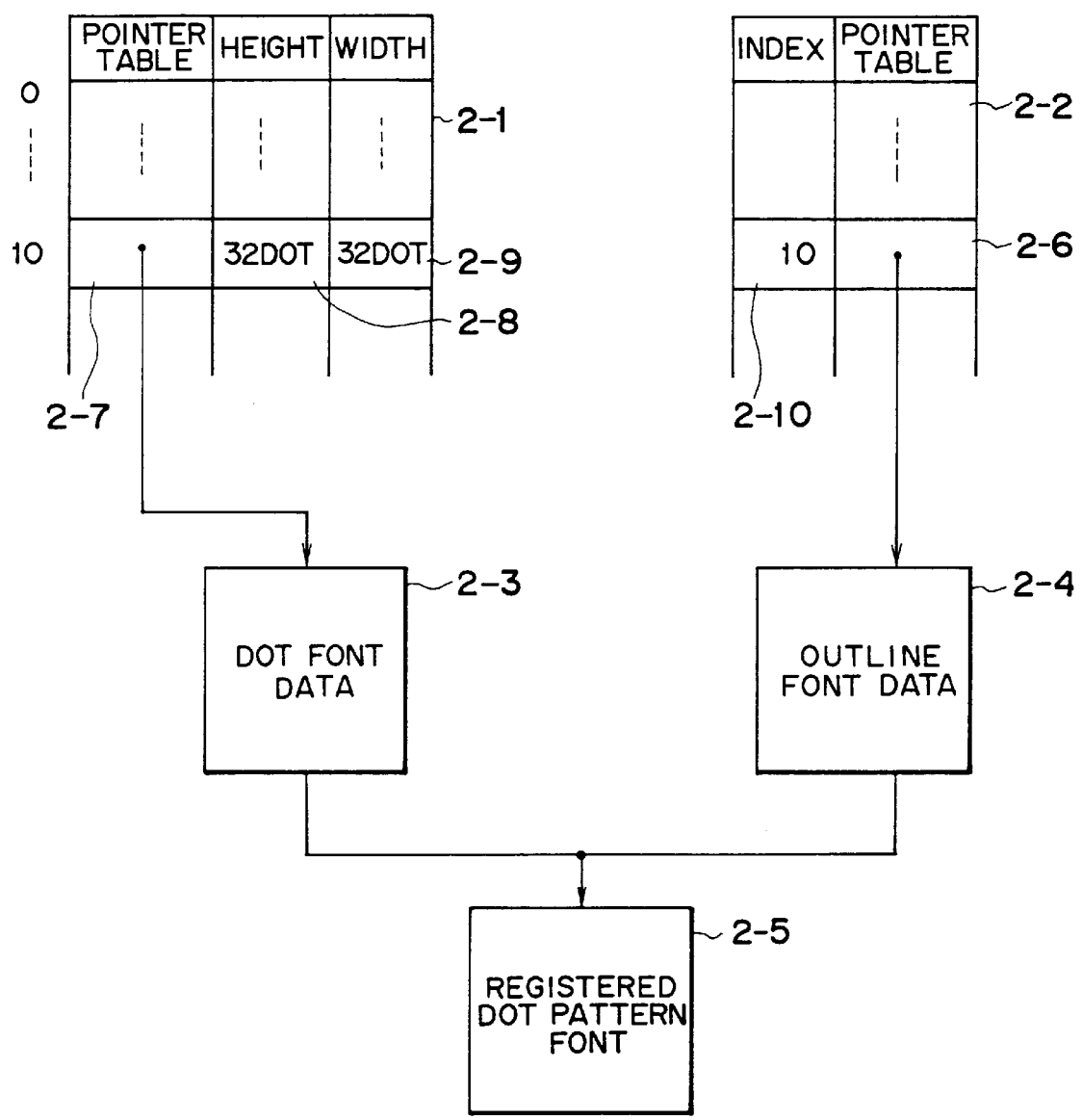
FIG. 2 is a link constructional diagram to use a dot font.

FIG. 2 shows a link construction to manage outline fonts and dot fonts which are managed by the CPU 1-3 in FIG. 1. In FIG. 2, reference numeral 2-1 denotes a dot font management table to manage only a dot font serving as an original pattern to produce an outline font; 2-2 indicates an outline font management table to manage only an outline font; 2-3 a dot font data regarding the registered dot fonts existing in the registration memory 1-4; and 2-4 outline font data regarding the outline fonts which are produced. For instance, a code length, a graphic set number, a type, a stroke, and a style are stored. Reference numeral 2-5 denotes a registered dot pattern font existing in the registration memory 1-4; 2-6 a pointer table indicative of outline character set data; 2-7 a pointer table indicative of dot character set data; 2-8 a height of a dot font pattern; 2-9 a width of a dot font pattern; and 2-10 an index indicative of a storage number in the dot font management table in which the dot font data has been stored. Information such as character kind, a style of type, and the like is described in the dot font data 2-3 and the outline font data 2-4. A character pointer for making the character pattern in the dot pattern font 2-5 correspond to the character code in a one-to-one corresponding manner has also been stored in the dot font data 2-3 and the outline font data 2-4.

Figure 3:
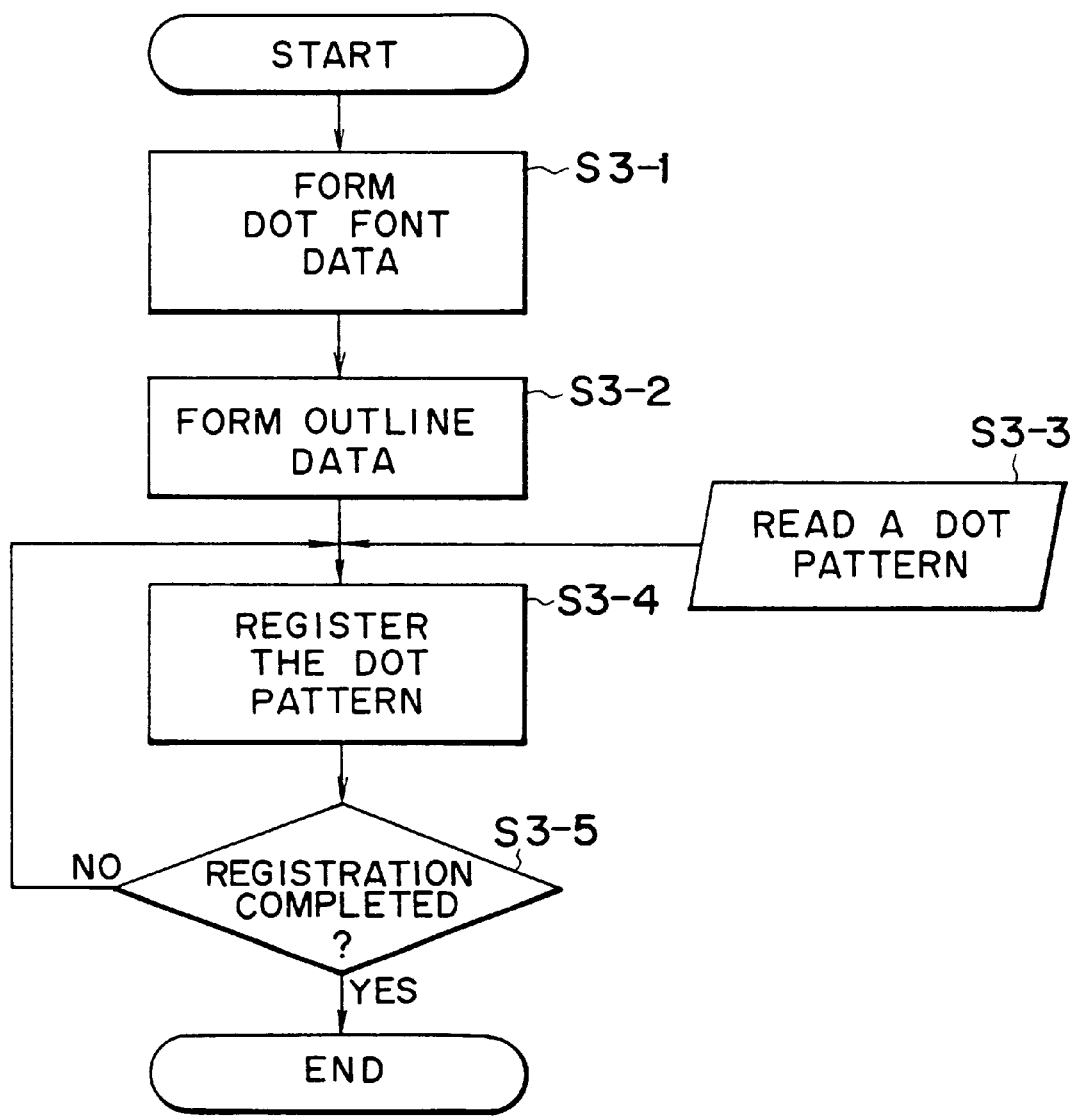
FIG. 3 is a flowchart for a registering process of character a pattern.

FIG. 3 is a flowchart showing a procedure of a registering process of a character pattern. Prior to the registering process, registration data of the character pattern is transferred from the host computer 1-1.

In step S3-1, the dot font data 2-3 in which a character kind, a style of type, and the like of the input dot font are stored is produced and its address is stored into the pointer table 2-7 in the dot font management table 2-1 and data regarding the height 2-8 and width 2-9 are also stored. In step S3-2, the outline font data 2-4 is produced and its address is stored into the pointer table 2-6 in the outline font management table 2-2. At this time, the storage numbers in the dot font management table 2-1 are stored into the index 2-10 in the outline management table 2-2. As mentioned above, the dot font pattern data 2-3 and the outline font data 2-4 produced from the data 2-3 are previously linked. In the above stage, outline font data is not formed.

In step S3-3, a dot pattern of one character is extracted from the reception buffer 1-2. In step S3-4, the address of the dot pattern font is stored as dot pattern font 2-5 into the dot pattern font data 2-3 in the registration memory 1-4. The character code and the character pattern are linked in a one-to-one corresponding manner and registered. In a manner similar to the above, the character code and the character pattern are linked in one-to-one correspondence with each other and registered into the outline font data 2-4.

In step S3-5, the above processes are repeated until the linking and registering operations of all of the character patterns are finished.

Figure 4:
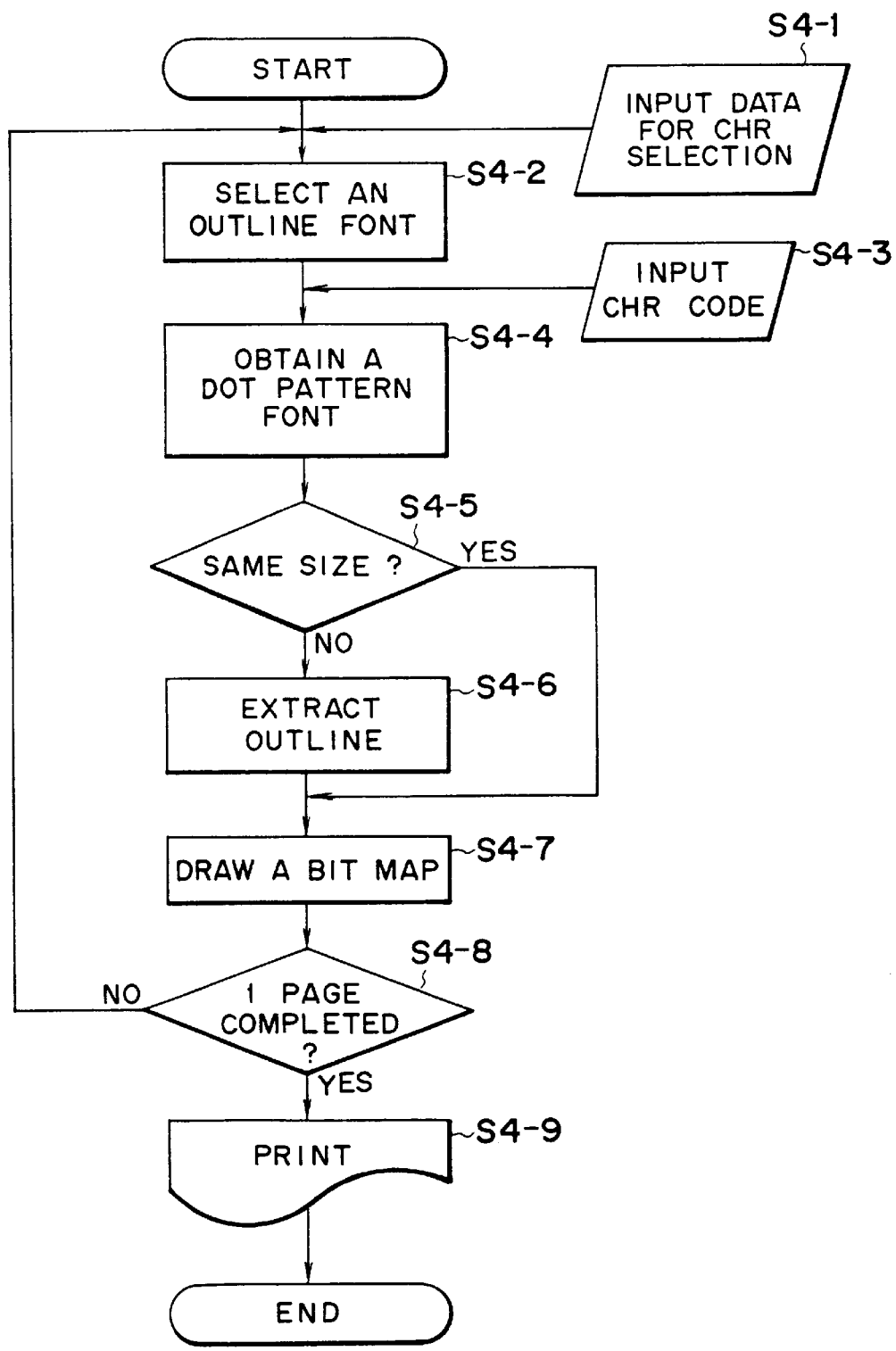
FIG. 4 is a flowchart for a process for printing a character.

FIG. 4 is a flowchart showing a procedure for a printing process when a registered character pattern is printed by the LBP. In FIG. 4, character set data (Ming sytle, Gothic style, etc.) to select character kind and a character format (height and width) are input in step S4-1. In step S4-2, an outline font is selected and extracted from the outline font management table 2-2 by using the data which has been input in step S4-1. At this time, the height and width for the outline font can be set to values which are different from the input values because an arbitrary shape can be formed. In step S4-3, a character code is read out of the reception buffer. In step S4-4, a corresponding dot pattern font is extracted from the registered dot pattern font 2-5 from a character pointer table corresponding to the character code in the outline font data 2-4 which has been selected in step S4-2. In step S4-5, the index 2-10 in the outline font management table 2-4 corresponding to the outline font which has been selected in step S4-2 is extracted and the height data 2-8 and the width data 2-9 in the dot font management table 2-1 designated by the index 2-10 are extracted. The extracted height and width data are compared with those of the character format which has been input in step S4-1. If the sizes differ, a process to extract an outline from a dot font pattern corresponding to the character code which has been input in step S4-3 is executed and the outline forming a character is extracted and outline pattern data is produced in step S4-6. In step S4-7, further, a dot pattern font of a size according to the input format is produced from the outline pattern. On the other hand, if the same dot font as that of the input character format has been registered in step S4-5, the dot pattern font extracted in step S4-4 is directly used. The dot pattern obtained as mentioned above is written into the bit map memory 1-6 and image data of the character pattern is produced in step S4-7. The above processes are repeated until completion of one page in step S4-8. After completion of the processing of one page, step S4-9 follows and an image is printed onto the recording paper by the method described in FIG. 5.

Not only an outline font is produced from the registered dot font but also a dot font stored in an ROM provided in a printing apparatus can be used.

Although the embodiment has been described with respect to the printing apparatus, the invention can be also applied to a display apparatus.

As described above, according to the invention, by providing means which is constructed in a manner such that a dot pattern font registered to form an outline font is directly stored as dots and, when a character code is supplied, the dot pattern font is converted into the outline font and a dot font of a designated shape is generated, the storage areas can be reduced.

I claims:

1. An output apparatus comprising:

input means for inputting character pattern information;

memory means for registering the input character pattern information in dot form;

discriminating means for discriminating whether character pattern information for a character pattern to be output is stored in said memory means after receipt of output information; and pattern generating means for (1) extracting character pattern information in vector form, from the dot form character pattern information stored in said memory means, and generating the character pattern to be output from the extracted vector form character pattern information, responsive to a discrimination by said discriminating means that the character pattern information for the character pattern to be output is not stored in said memory means, and for (2) generating the character pattern to be output from the dot form character pattern information stored in said memory means responsive to a discrimination by said discriminating means that the character pattern information for the character pattern to be output is stored in said memory means.

2. An apparatus according to claim 1, wherein the dot form character pattern information stored in said memory means is information that has been received from a host computer.

3. An apparatus according to claim 1, further comprising means for outputting the character pattern generated by said pattern generating means.

4. An apparatus according to claim 3, wherein said outputting means comprises a printer.

5. An apparatus according to claim 1, further comprising a table which stores first management information for managing the dot form character pattern information stored in said memory means and second management information for managing the vector form character pattern information extracted by said pattern generating means.

6. An apparatus according to claim 5, wherein the first management information comprises position information indicative of a position in said memory means at which the dot form character pattern information is stored, width information indicative of a width of the dot form character pattern information, and height information indicative of a height of the dot form character pattern information, and wherein the second management information comprises link information for linking the vector form character pattern information to the corresponding dot form character pattern information and position information indicative of a position at which the vector form character pattern information is stored.

7. An apparatus according to claim 1, further comprising means for inputting style information for selecting a style of the character pattern to be output, shape information indicative of a shape of the character pattern to be output, including its height or width, and a character code for the character pattern to be output.

8. An apparatus according to claim 1, further comprising storage means for storing management data to be used for managing dot form and vector form character patterns, wherein said pattern generating means operates responsive to the management data stored in said storage means.

9. An output method, said method comprising the steps of:
receiving character pattern information;
registering the character pattern information in dot form in a memory;
discriminating whether character pattern information for a character pattern to be output is stored in the memory after receipt of output information; and
extracting character pattern information in a vector form from the stored dot form character pattern information and generating the character pattern to be output from the extracted vector form character pattern information responsive to a discrimination in said discriminating step that the character pattern information for the character pattern to be output is not stored in the memory, and generating the character pattern to be output from the stored dot form character pattern information, responsive to a discrimination in said discriminating step that the character pattern information for the character pattern to be output is stored in the memory.

10. A method according to claim 9, wherein the stored dot form character pattern information is information that has been received from a host computer.

11. A method according to claim 9, further comprising the step of outputting the generated character pattern.

12. A method according to claim 11, wherein said outputting step includes outputting the generated character pattern using a printer.

13. A method according to claim 9, further comprising the step of using a table which stores first management information for managing the stored dot form character pattern information and second management information for managing the extracted vector form character pattern information.

14. A method according to claim 13, wherein the first management information comprises position information indicative of a position in the memory at which the dot form character pattern information is stored, width information indicative of a width of the dot form character pattern information, and height information indicative of a height of the dot form character pattern information, and wherein the second management information comprises link information for linking the vector form character pattern information to the corresponding dot form character pattern information and position information indicative of a position at which the vector form character pattern information is stored.

15. A method according to claim 9, further comprising the step of inputting style information for selecting a style of the character pattern to be output, shape information indicative of a shape of the character pattern to be output, including its height or width, and a character code for the character pattern to be output.

16. A method according to claim 9, further comprising the step of storing management data to be used for managing dot form and vector form character patterns, wherein said pattern generating step is performed responsive to the management data.

17. A storage medium containing computer readable program comprising code for controlling an output apparatus, which upon execution will cause the output apparatus to:
receive character pattern information;
register the character pattern information in dot form in a memory;
discriminate whether character pattern information for a character pattern to be output is stored in the memory after receipt of output information; and
extract character pattern information in a vector form from the stored dot form character pattern information and generate the character pattern to be output from the extracted vector form character pattern information responsive to a discrimination that the character pattern information for the character pattern to be output is not stored in the memory, and generate the character pattern to be output from the stored dot form character pattern information, responsive to a discrimination that the character pattern information for the character pattern to be output is stored in the memory.

18. A storage medium according to claim 17, wherein the stored dot form character pattern information is information that has been received from a host computer.

19. A storage medium according to claim 17, further comprising code which upon execution will cause the output apparatus to output the generated character pattern.

20. A storage medium according to claim 19, wherein the output apparatus outputs the generated character pattern using a printer.

21. A storage medium according to claim 17, further comprising code which upon execution will cause the output apparatus to use a table which stores first management information for managing the stored dot form character pattern information and second management information for managing the extracted vector form character pattern information.

22. A storage medium according to claim 21, wherein the first management information comprises position information indicative of a position in the memory at which the dot form character pattern information is stored, width information indicative of a width of the dot form character pattern information, and height information indicative of a height of the dot form character pattern information, and wherein the second management information comprises link information for linking the vector form character pattern information to the corresponding dot form character pattern information and position information indicative of a position at which the vector form character pattern information is stored.

23. A storage medium according to claim 17, further comprising code which upon execution will cause the output apparatus to receive style information for selecting a style of the character pattern to be output, shape information indicative of a shape of the character pattern to be output, including its height or width, and a character code for the character pattern to be output.

24. A storage medium according to claim 17, further comprising code which upon execution will cause the output apparatus to store management data to be used for managing dot form and vector form character patterns, wherein said code for pattern generating is executed responsive to the management data.

* * * * *

UNITED STATES PATENT AND TRADEMARK OFFICE
CERTIFICATE OF CORRECTION

PATENT NO. : 6,061,070

DATED : May 9, 2000

INVENTOR(S) : AKIO SUGAYA

Page 1 of 2

It is certified that error appears in the above-identified patent and that said Letters Patent is hereby corrected as shown below:

ON THE TITLE PAGE [56] References Cited:

U.S. PATENT DOCUMENTS, "Piscolli" should read
        --Pisculli--; and
    FOREIGN PATENT DOCUMENTS,
        "63315256 4/1989" should read --63-315256 4/1988--.
        01128843                       1-28843
        02001349                       2-001349

COLUMN 1:

Line 51, "of" should read --of a--;
    Line 52, "a" should be deleted.

COLUMN 2:

Line 21, "on/off switches" should read --on/off-switches--; and
    Line 52, "a" should be deleted.

COLUMN 3:

Line 35, "sytle," should read --style,--; and
    Line 36, "character kind" should read --a character kind--.

COLUMN 4:

Line 17, "claims:" should read --claim:--.

UNITED STATES PATENT AND TRADEMARK OFFICE
CERTIFICATE OF CORRECTION

PATENT NO. : 6,061,070

DATED : May 9, 2000

INVENTOR(S) : AKIO SUGAYA

It is certified that error appears in the above-identified patent and that said Letters Patent is hereby corrected as shown below:

COLUMN 6:

Line 1, "containing" should read --containing a--.

Signed and Sealed this

Twenty-second Day of May, 2001

*Attest:*

NICHOLAS P. GODICI

*Attesting Officer*   Acting Director of the United States Patent and Trademark Office